(12) United States Patent
Cox et al.

(10) Patent No.: US 11,485,313 B2
(45) Date of Patent: Nov. 1, 2022

(54) INFLATOR FOR A PASSIVE VEHICLE SAFETY DEVICE

(71) Applicant: AUTOLIV ASP, INC., Ogden, UT (US)

(72) Inventors: Matthew A. Cox, Centerville, UT (US); Romain Danielou, Bountiful, UT (US); Kevin Smith, Bountiful, UT (US)

(73) Assignee: Autoliv ASP, Inc., Ogden, UT (US)

(*) Notice: Subject to any disclaimer, the term of this patent is extended or adjusted under 35 U.S.C. 154(b) by 260 days.

(21) Appl. No.: 16/909,960

(22) Filed: Jun. 23, 2020

(65) Prior Publication Data

US 2021/0394703 A1 Dec. 23, 2021

(51) Int. Cl.
*B60R 21/264* (2006.01)
*B60R 21/26* (2011.01)

(52) U.S. Cl.
CPC ... *B60R 21/264* (2013.01); *B60R 2021/26011* (2013.01); *B60R 2021/26029* (2013.01);
(Continued)

(58) Field of Classification Search
CPC .......... B60R 2021/2642; B60R 21/272; B60R 2021/2644
See application file for complete search history.

(56) References Cited

U.S. PATENT DOCUMENTS 6,474,684 B1 * 11/2002 Ludwig .................... C06D 5/06
280/736
6,666,476 B2 * 12/2003 Rink ................... B60R 21/2644
280/741

(Continued)

FOREIGN PATENT DOCUMENTS

EP          1669258 A1 *  6/2006  ......... B60R 21/2644
JP       2020082775 A  *  6/2020
(Continued)

OTHER PUBLICATIONS

International Search Report and Written Opinion in PCT/US2021/028100, dated Aug. 30, 2021.

*Primary Examiner* — Nicole T Verley
(74) *Attorney, Agent, or Firm* — Harness, Dickey & Pierce, P.L.C.; Stephen T. Olson

(57) ABSTRACT

A dual stage inflator includes a housing defining an internal cavity including a combustion chamber. The combustion chamber includes a first portion having a first gas generant material separated from a second portion having a second gas generant material. A gas generant retaining wall is disposed in the housing. A first stage ignition device is disposed in the first portion of the combustion chamber. A second stage ignition device is disposed in the second portion of the combustion chamber. A lid normally closes the second portion of the combustion chamber and is spaced from the gas generant retaining wall. The lid is moveable to an open position opening the second portion of the internal cavity to release combustion gas and abutting the gas generant retaining wall in response to an increase of pressure within the second portion of the combustion chamber. An outer side of the lid and the adjacent side of the gas generant retaining wall are cooperatively configured to allow a flow of combustion gas between the gas generant retaining wall and the lid when the lid abuts the gas generant retaining wall in the open position.

20 Claims, 6 Drawing Sheets

(52) U.S. Cl.
CPC ............... *B60R 2021/2642* (2013.01); *B60R 2021/26076* (2013.01)

(56) References Cited

U.S. PATENT DOCUMENTS

| | | | | |
|---|---|---|---|---|
| 6,702,323 | B2* | 3/2004 | Goetz | B60R 21/217 280/736 |
| 6,929,284 | B1* | 8/2005 | Saso | B60R 21/2644 280/736 |
| 7,347,448 | B2* | 3/2008 | Smith | B60R 21/26 280/736 |
| 8,047,569 | B2* | 11/2011 | Cox | B60R 21/264 280/736 |
| 8,276,521 | B2* | 10/2012 | Reichelt | B60R 21/2644 280/736 |
| 8,556,294 | B1* | 10/2013 | Norman, III | B60R 21/264 280/736 |
| 8,740,245 | B2* | 6/2014 | Fukawatase | B60R 21/26 280/736 |
| 10,875,490 | B2* | 12/2020 | Norman, III | B60R 21/2644 |
| 2001/0001523 | A1* | 5/2001 | Green, Jr. | B60R 21/2644 280/736 |
| 2002/0005636 | A1 | 1/2002 | McFarland et al. | |
| 2003/0146611 | A1* | 8/2003 | Kenney | B60R 21/2644 280/736 |
| 2004/0155444 | A1* | 8/2004 | Matsuda | B60R 21/2644 280/741 |
| 2005/0161924 | A1* | 7/2005 | Schoenhuber | B60R 21/2644 280/741 |
| 2005/0184498 | A1* | 8/2005 | Trevillyan | B60R 21/2644 280/741 |
| 2007/0120349 | A1* | 5/2007 | Hoffman | B60R 21/2644 280/741 |
| 2015/0191144 | A1 | 7/2015 | McFarland | |

FOREIGN PATENT DOCUMENTS

| | | | | |
|---|---|---|---|---|
| WO | WO-2016017465 | A1 * | 2/2016 | ............... B01J 7/00 |
| WO | WO-2017006697 | A1 * | 1/2017 | ............. B60R 21/26 |
| WO | WO-2021075376 | A1 * | 4/2021 | |

* cited by examiner

INFLATOR FOR A PASSIVE VEHICLE SAFETY DEVICE

FIELD

The present disclosure generally concerns an inflator to provide inflation gases for a passive vehicle safety device, such as an inflatable airbag.

BACKGROUND

This section provides background information related to the present disclosure which is not necessarily prior art.

Inflatable occupant restraints or airbags are commonly included on motor vehicles. In the event of an accident, a sensor within the vehicle measures abnormal deceleration, for example, and triggers inflation of the airbag within a few milliseconds with gas produced by a device commonly referred to as an "inflator". The inflated airbag cushions the vehicle occupant from impact forces.

Inflators may commonly have one or more chambers containing gas generant materials. Adaptive pyrotechnic inflators having gas generant materials in two chambers, which are independently activated by two ignition devices commonly referred to as "dual stage" inflators. In practice, each such gas generant material-containing chamber may be referred to as a "combustion chamber" as the gas generant material therein is combusted or otherwise reacted to produce gas used to inflate an associated occupant restraint.

One known inflator is shown and described in commonly assigned U.S. Pat. No. 7,950,693. The inflator is a dual stage inflator device including a housing defining first and second chambers each containing a quantity of gas generant combustible to produce inflation gases. U.S. Pat. No. 7,950,693 is incorporated by reference as if fully set forth herein.

While known inflators for inflatable occupant restraints, including the inflator of U.S. Pat. No. 7,950,693, have generally proven to be suitable for their intended uses, a continuous need for improvement in the relevant art remains.

SUMMARY

This section provides a general summary of the disclosure, and is not a comprehensive disclosure of its full scope or all of its features.

It is a general object of the present teachings to provide a dual stage inflator with improved flow of inflation gases.

In accordance with one particular aspect, the present teachings provide a dual stage inflator including a housing defining an internal cavity including a combustion chamber. The combustion chamber includes a first portion having a first gas generant material separated from a second portion having a second gas generant material. A gas generant retaining wall is disposed in the housing. A first stage ignition device is disposed in the first portion of the combustion chamber. A second stage ignition device is disposed in the second portion of the combustion chamber. A lid normally closes the second portion of the combustion chamber and is spaced from the gas generant retaining wall. The lid is moveable to an open position opening the second portion of the internal cavity to release combustion gas and abutting the gas generant retaining wall in response to an increase of pressure within the second portion of the combustion chamber. An outer side of the lid and an adjacent side of the gas generant retaining wall are cooperatively configured to allow a flow of combustion gas between the gas generant retaining wall and the lid when the lid abuts the gas generant retaining wall in the open position.

In accordance with another particular aspect, the present teachings provide a method of providing inflation gases to a safety device with the dual stage inflator. The method includes activating the second stage ignition device and increasing a pressure in the second portion of the internal cavity to move the lid to the open position abutting the gas generant retaining wall. The method further includes maintaining a combustion gas flow path for combustion gases between the lid and the gas generant retaining wall with a raised portion of the lid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
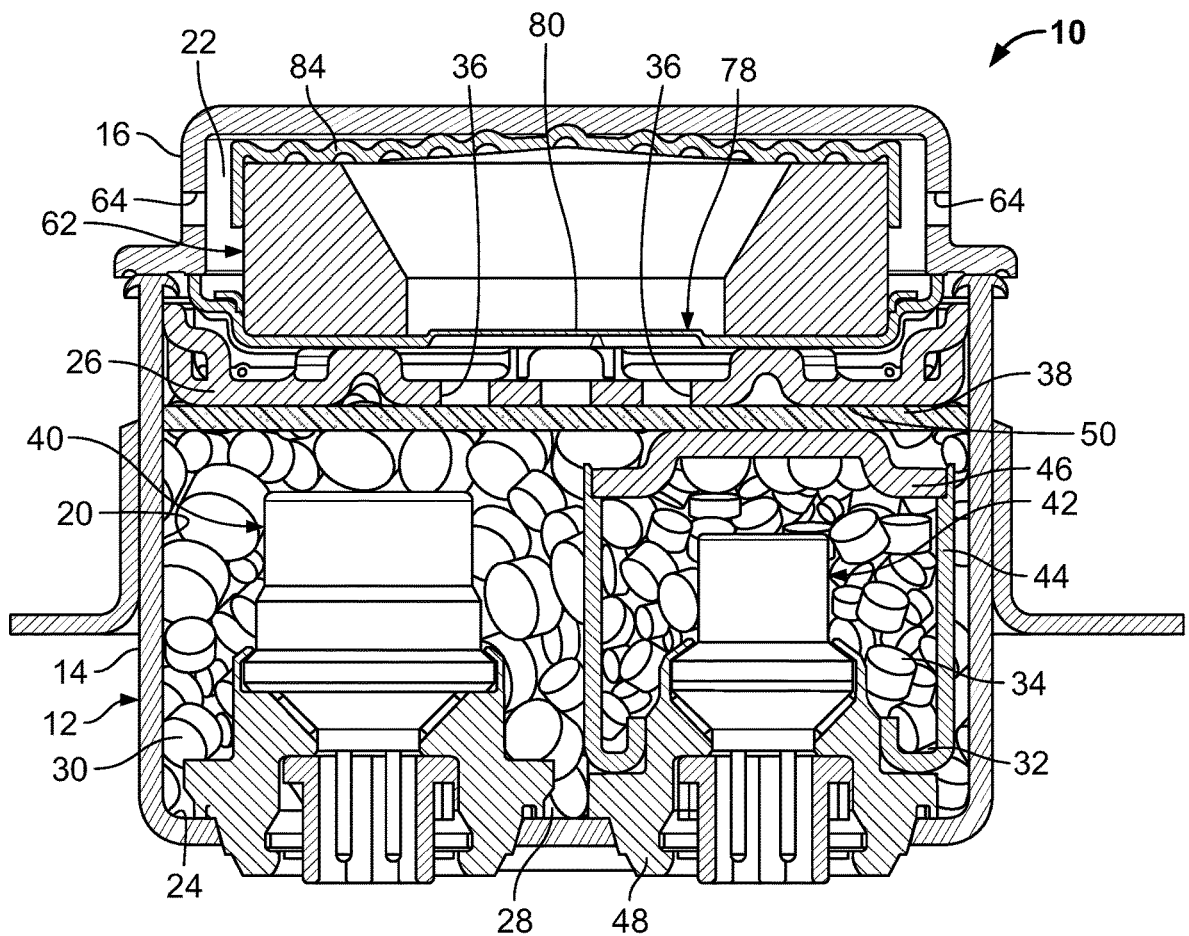
FIG. 1 is a cross-sectional view of an inflator for an inflatable occupant restraint in accordance with the present teachings, the inflator shown prior to activation.

One or more example embodiments will now be described more fully with reference to the accompanying drawings. The one or more example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, and that the example embodiment should not be construed to limit the scope of the present disclosure. Well-known processes, well-known device structures, and well-known technologies are not described herein in detail.

The phrases "connected to", "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "adjacent" refers to items that are in close physical proximity with each other, although the items may not necessarily be in direct contact. The phrase "fluid communication" refers to two features that are connected such that a fluid within one feature is able to pass into the other feature. "Exemplary" as used herein means serving as a typical or representative example or instance, and does not necessarily mean special or preferred.

With reference to drawings, an inflator for an inflatable occupant protection device in accordance with the present teachings is illustrated and generally identified at reference character 10. The inflator 10 is part of an occupant restraint system of a motor vehicle that includes an inflatable airbag (not particularly shown). The inflator 10 shown in the drawings is a dual-stage inflator particularly adapted for a driver side front airbag. It will be understood, however, that various aspects of the present teachings may be readily adapted for use with passenger side front airbags and other airbags.

The inflator 10 is generally illustrated to include housing 12 having a first housing portion 14 and a second housing portion 16. In the embodiment illustrated, the housing 12 has a generally circular cross section. The first housing portion 14 may be inertia welded or otherwise suitably attached to the second housing portion 16. The first and second housing portions 14 and 16 cooperate to define an internal cavity 20 having a filter chamber 22 separated from a combustion chamber 24 by an internal wall 26.

The combustion chamber 24 includes a first portion or first combustion chamber portion 28 containing a first gas generant material 30. The combustion chamber 24 further includes a second portion or second combustion chamber portion 32 containing a second gas generant material 34. Insofar as the present teachings are concerned, the first and second gas generant materials 30 and 34 may be the same material or may be different materials.

The internal wall may be a vented wall or gas generant retaining wall 26 for retaining the first and second gas generant materials 30 and 34 within the combustion chamber 24. The gas generant retaining wall 26 includes a plurality of openings 36 for venting combustion gases from the combustion chamber 24 to the filter chamber 22. A foam disc 38 may be disposed in the combustion chamber 24 adjacent to the gas generant retaining wall 26. As will be understood by those skilled in the art, the foam disc conventionally functions to provide stability to the storage of the first and second gas generant materials 30 and 34 which may settle within the combustion chamber 24 over time. The foam disc may be consumed upon combustion of the first and second gas generant materials 30 and 34.

A first stage ignition device 40 is disposed in the first portion 28 of the combustion chamber 24 for combusting the first gas generant material 30. A second stage ignition device 42 is correspondingly disposed in the second portion 32 of the combustion chamber 24 for combusting the second gas generant material 34. The first and second stage ignition devices 40 and 42 will be understood to be conventional in construction and operation insofar as the present teachings are concerned. The first and second stage ignition devices 40 and 42 may be conventional mounted to or mated with the housing 12.

The second portion 32 of the combustion chamber 24 is defined by one or more sidewalls 44 and a lid 46. In the embodiment illustrated, the one or more sidewalls includes a single, continuous wall or chamber wall 44. The wall 44 may be oval, circular or of any other cross-sectional shape. At a first end (the lower end as shown in the drawings) of the chamber wall 44, the chamber wall 44 receives the second stage ignition device 42 and a base 48 of the second stage ignition device 42 closes the first end. At a second or opposite end (the upper end as shown in the drawings) of the chamber wall 44, the lid 46 normally (i.e., prior to activation of the inflator 10) closes the second portion 32 of the combustion chamber 24. The lid 46 may be oval in shape or otherwise cooperatively configured with the chamber wall 44 to close the second portion 32 of the combustion chamber 24.

The lid 46 is movable in an axial direction from a first or closed position prior to combustion of the gas generant materials to a second or open position following combustion of the gas generant materials. The inflator 10 is shown prior to combustion of the gas generant materials 30 and 34 in FIG. 1 and after combustion of the gas generant materials 30 and 34 in FIG. 1. Explaining further, prior to combustion of the second gas generant material 34 (as shown in the cross-sectional view of FIG. 1), the lid 46 is axially spaced from the generant retaining wall 26. As illustrated, the lid 46 may be spaced from the generant retaining wall 26 by the foam disk 38. Upon combustion of the second gas generant material 34 (as shown in the cross-sectional view of FIG. 1A), the foam disk 38 is consumed by the heat of the reaction and the lid 46 is axially displaced (upward as shown in the drawings) to a position adjacent to the generant retaining wall 26 in response to an increase of pressure within the second portion 32 of the combustion chamber 24.

An outer side 50 of the lid 46 and an adjacent side 52 of the generant retaining wall 26 may be cooperatively configured to allow an improved flow of combustion gas between the gas generant retaining wall 26 and the lid 46 when the lid abuts the gas generant retaining wall 26 in the open position. In this regard, at least one of the outer side 50 of the lid and the adjacent side 52 of the gas generant retaining wall 26 includes a planar portion 54 and a raised portion 56. In the embodiment illustrated, the lid 46 includes the planar portion and the raised portion 56 and the adjacent side 52. The raised portion may be stamped into the lid 46 or otherwise formed with or into the lid 46, and may outwardly extend from the planar portion 54 in a direction away from the second portion 32 of the combustion chamber 24.

The raised portion 56 of the lid 46 is configured to cooperate with the gas generant retaining wall 26 and maintain a generally parallel orientation between the gas generant retaining wall 26 and the planar portion 54 of the lid 46 when the lid 46 is in the open position and abutting the gas generant retaining wall 26. To this end, the raised portion 56 includes at least three spaced apart points defining a plane perpendicular to an axial direction that abut the gas generant retaining wall 26 to maintain the generally parallel orientation. Perhaps more preferably, the raised portion includes at least three legs 58 each outwardly extending from a common point 60 in a direction parallel to the gas generant retaining wall 26. In the embodiment illustrated, the raised portion has a cruciform shape with four legs 58 each outwardly extending from the common point 60 in the direction parallel to the gas generant retaining wall 26. Each of the legs 58 may have a generally convex shape. It will be appreciated that the legs 58 of the raised portion 56 may alternatively be spaced from each other (i.e., not connected to one another through a common point 60).

At least one of the gas generant retaining wall 26 and the raised portion 56 of the lid 46 may be constructed of a material that partially deforms upon movement of the lid 46 from the first position to the second position under the heat and pressure of the reaction. This partial deformation may increase surface area contact between the lid 46 and the gas generant retaining wall 26 to avoiding tilting of the lid 46 while maintaining the combustion gas flow path therebetween. In one embodiment, the lid 46 may be constructed of carbon steel and the gas generant retaining wall may similarly be constructed of carbon steel.

A filter 62 is disposed in the filter chamber 22 for filtering combustion gases before the combustion gases are exhausted through radially extending ports 64 in the second portion 16 of the housing 12. The second portion 16 of the housing 12 may be a diffuser cap portion. The filter 62 includes a main body 66 and an opening 68 that axially passes through the main body 66. The opening 68 has a first end 70 at a first axial side 72 of the main body portion 66 and a second end 74 at a second axial side 76 of the main body portion 66. The first end 70 of the opening 68 has a first diameter $D_1$. The second end 74 has a second diameter $D_2$. The second diameter $D_2$ is greater than the first diameter $D_1$.

The opening 68 includes a first axially extending portion 68A inwardly extending into the main body portion 66 from the first axial side 72 and a second axially extending portion 68B inwardly extending into the main body portion 66 from the second axial side 76. The first axially extending portion 68A may have a cylindrical shape. The second axially extending portion 68B may have a frustoconical shape. The frustoconical shape of the second axially extending portion 68B may outwardly taper from the first diameter $D_1$ adjacent the first axially extending portion 68A to the second diameter $D_2$ at the second end 74. The second axially extending portion 68A may outwardly taper at an angle α.

In one particular application, the first axially extending portion 68A has a first height $H_1$ of approximately 3.5 mm, the second extending portion 68B has a second height H2 of approximately 7.2 mm, and the second axially extending portion 68A outwardly tapers at an angle between 45 degrees and 70 degrees, and more preferably at an angle of approximately 60 degrees. In this particular example, the first diameter $D_1$ of the first end 70 of the opening 68 is approximately 19.5 mm and the second diameter $D_2$ of the second end 74 of the opening 68 is approximately 27.8 mm.

The opening 68 of the filter 62 may alternatively include a stepped shape. In this regard, the opening 68 may be alternatively defined by one or more cylindrical portions of different diameters. For example, the second axially extending portion 68B of the opening 68 may alternatively be cylindrically shaped with a stepped portion between the first and second axially extending portions 68A and 68B.

The filter 62 may include a first filter portion 62A radially surrounding the first axially extending portion 68A and a second filter portion 62B radially surrounding the second axially extending portion 68B. The first filter portion 62A may have a first radial density in a radial direction and the second filter portion may have a second radial density in the radial direction. The second radial density may be greater than the first radial density such that combustion gases more easily radially flow through the first filter portion 62A as compared to radially through the second filter portion 62B. The second filter portion 68B may have a variable density in the radial direction that increases from the first filter portion 62A to the second axial side 76 of the filter 62. The variable density of the second filter portion 68B may linearly increase from adjacent the first filter portion 62A to the second axial side 76 of the filter 62.

The filter 62 may be constructed of metal. More preferably, the filter may be a woven wire mesh filter. The frustoconical shape of the portion of the opening 68 passing through the second filter portion 62B may be defined by a correspondingly shaped mandrel. In this regard, a mandrel (not shown) used to create the frustoconical shape of the second axially extending portion 68B of the opening 68 may have a male frustoconical shape corresponding to the shape of the second axially extending portion 68B. The wire mesh filter 62 may be compressed from an initial, generally toroidal shape by the mandrel which is inserted into the opening 68. Compression of the wire mesh of the filter 62 with the mandrel may simultaneously axially compress the wire mesh of the first and second filter portions 62A and 62B and radially compress the wire mesh of the second filter portion 62B. Insofar as the wire mesh of the first filter portion 62A is not radially compressed (or at least radially compressed to a lesser degree), the density of the second filter portion 62B is greater than the density of the first filter portion 62A.

Figure 7A:
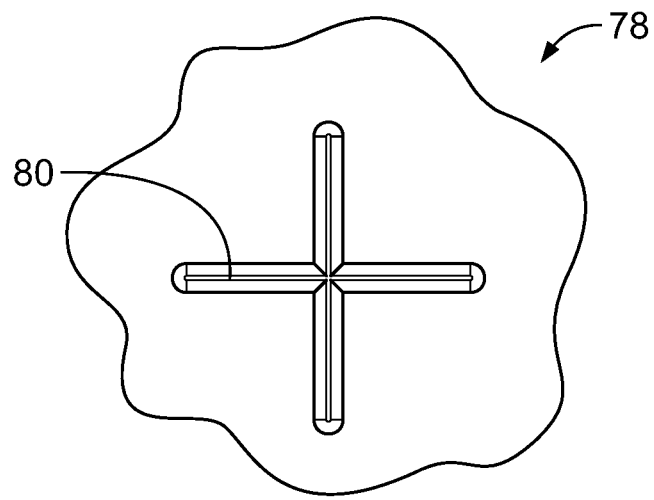
FIG. 7A is a top view of a central portion of the plate of FIG. 7, the plate shown prior to activation of the inflator.
Figure 7B:
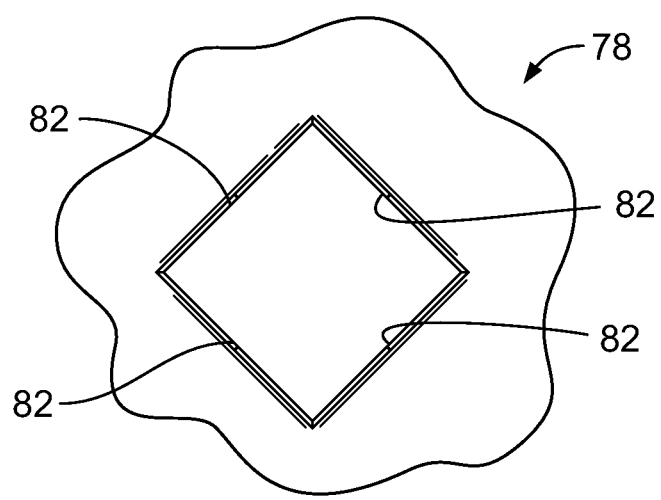
FIG. 7B is a top view similar to FIG. 7, the plate shown after activation of the inflator.

A plate 78 disposed in the housing 12 axially separates the filter chamber 22 and the combustion chamber 24. The plate 78 may be disposed adjacent the first axial side 72 of the filter 62 and may include a weakened zone 80. The weakened zone 80 may be adapted to open in response to an increase in pressure within the combustion chamber 24. The weakened zone 80 is shown prior to opening in FIGS. 1 and 7A. The weakened zone 80 is shown after opening in FIGS. 2 and 7B. In the embodiment illustrated, the weakened zone 80 has a cruciform shape. As such, the weakened zone 80 opens to define four petals 82. It will be understood, however, that alternately shaped weakened zones may be employed within the scope of the present teachings to define a greater or lesser number of petals 82. After the weakened zone 80 opens, a plurality of petals 82 of the plate 78 axially extend into the filter chamber 22. The first axially extending portion 68A of the filter 62 is sized and positioned to oppose radial movement of the plurality of petals 82 upon opening of the weakened zone 80. The petals 82 of the plate 78 are radially spaced from the second diameter of the second axially extending portion 68B of the opening 68 upon opening of the weakened zone.

An insulating plate 84 is axially disposed between the filter 62 and the second housing portion 16. Combustion gases passing through the filter 62 elevate the temperature of the filter 62. The insulating plate 84 functions to protect the second housing portion 16 from these elevated filter temperatures.

Figure 1A:
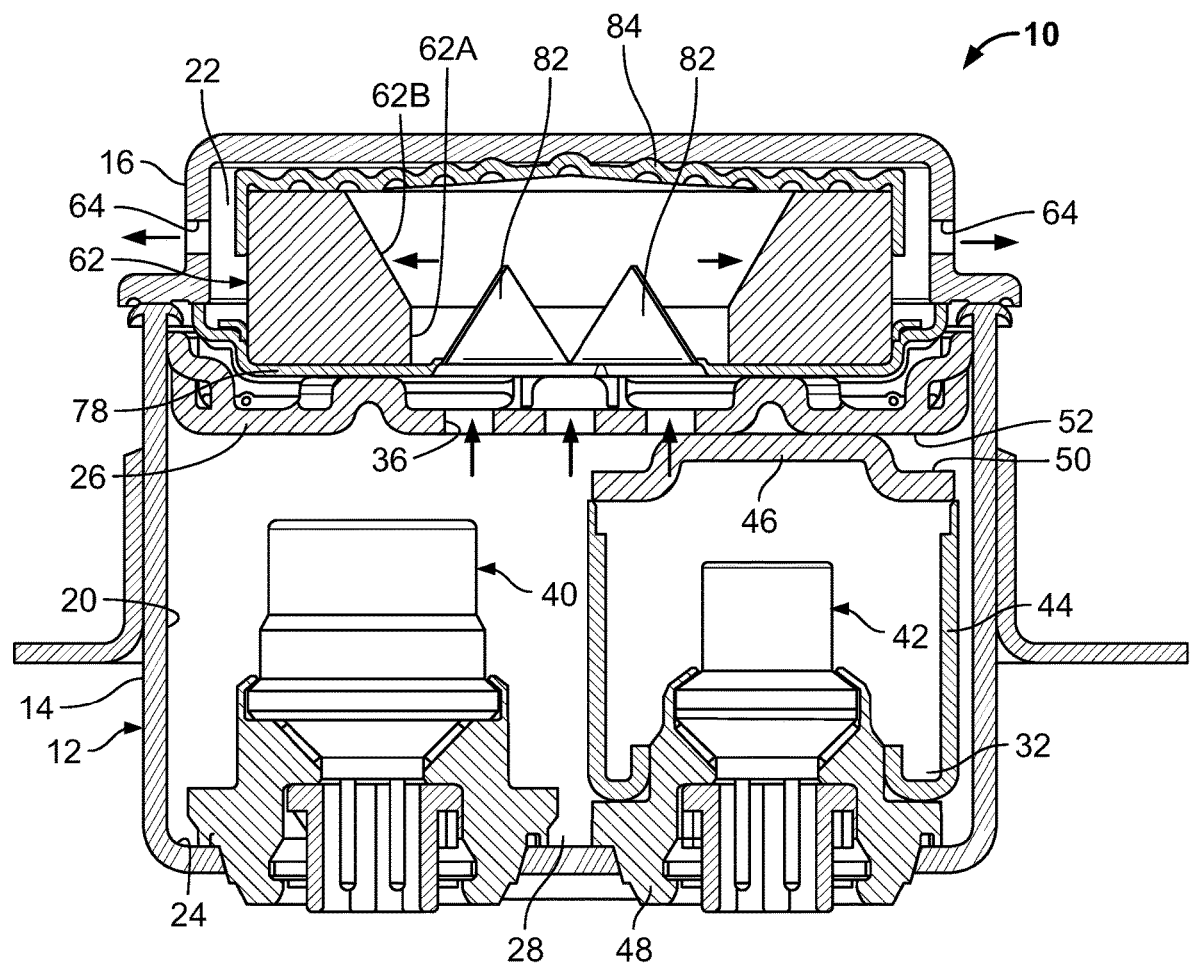
FIG. 1A is a cross-sectional view of the inflator of the present teachings similar to FIG. 1, the inflator shown after activation.
Figure 2:
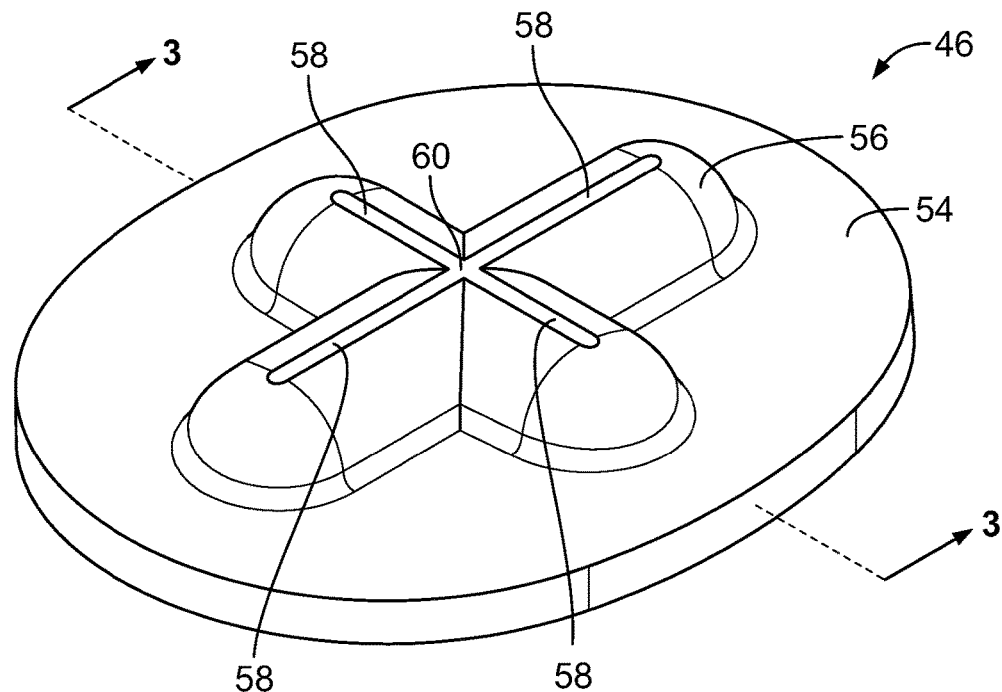
FIG. 2 is a perspective view of a lid of a second stage ignitor device in accordance with the present teachings.
Figure 3:
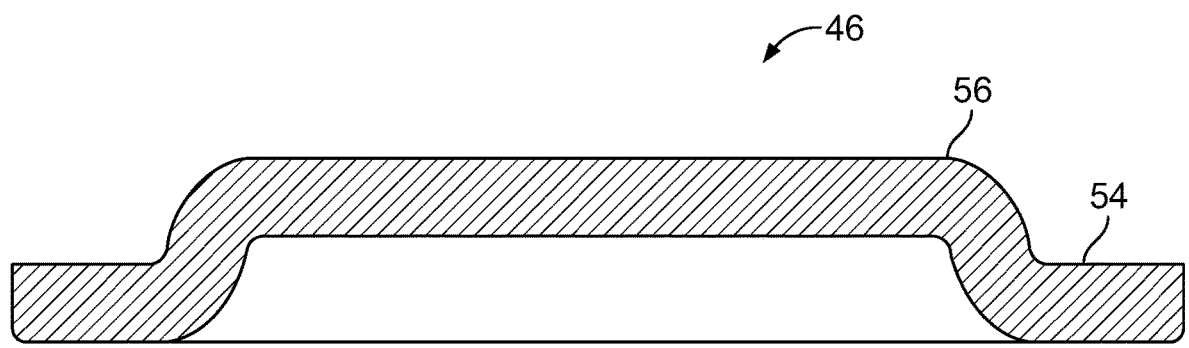
FIG. 3 is a cross-sectional view taken along the line 3-3 of FIG. 2.
Figure 4:
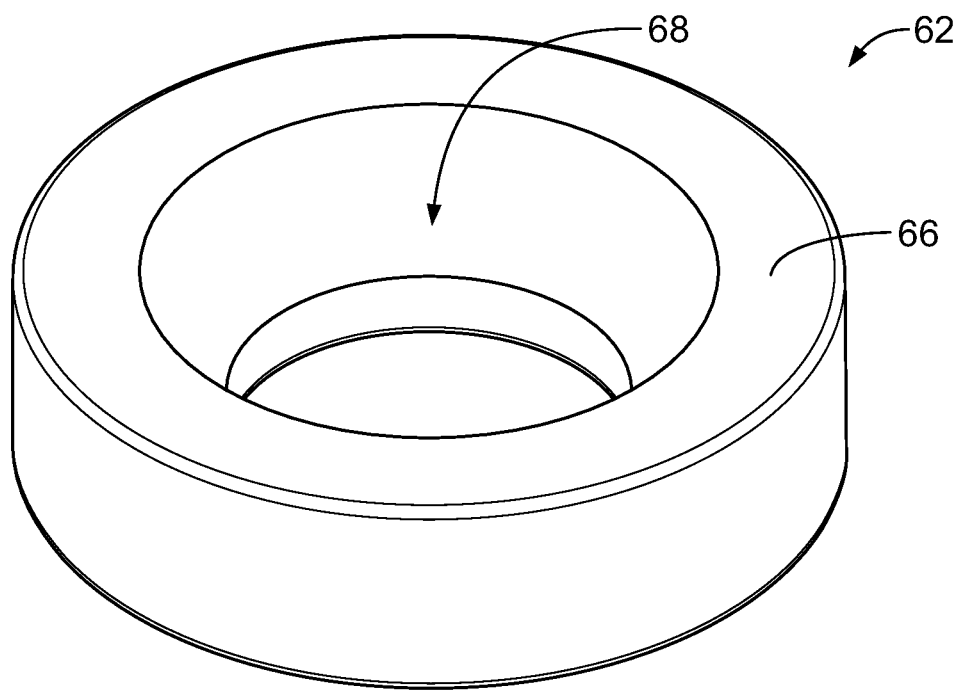
FIG. 4 is a simplified perspective view of a filter of the inflator of the present teachings.
Figure 5:
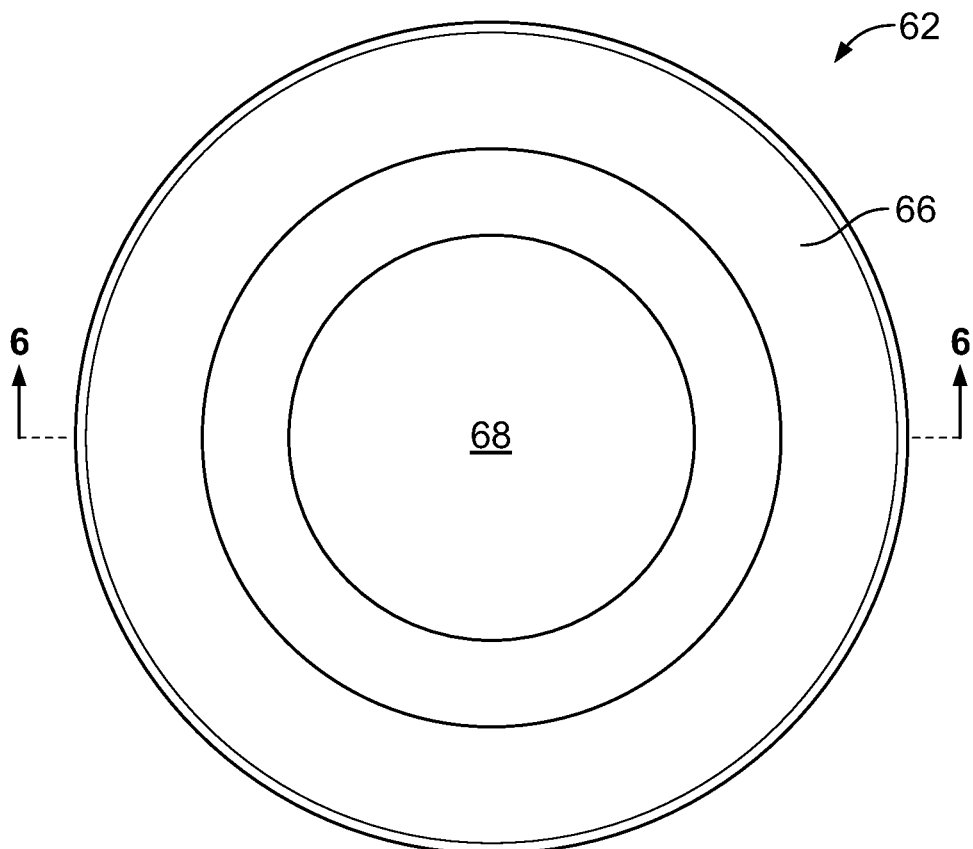
FIG. 5 is a top view of the filter of FIG. 4.
Figure 6:
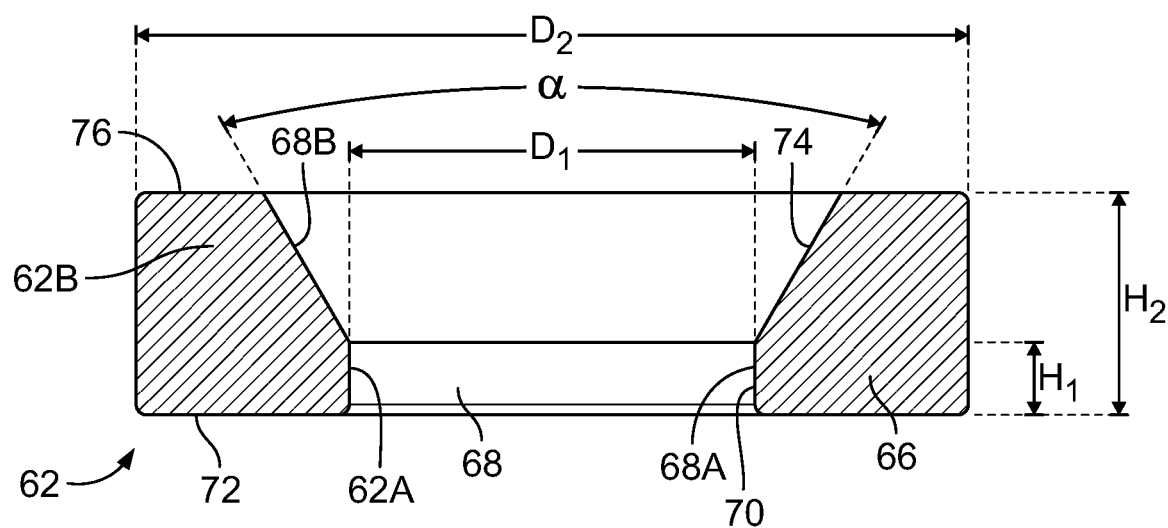
FIG. 6 is a cross-sectional view taken along the line 6-6 of FIG. 5.

With particular reference to the cross-sectional views of FIGS. 1 and 2, operation of the inflator 10 of the present teachings will be described. Flow of combustion gases is represented in FIG. 1A with arrows. It will be understood, however, that the arrows included in FIG. 1A identify the primary flow of combustion gases through the inflator 10 in a simplified manner.

Upon activation of the inflator 10, the first gas generant material 30 begins to ignite and produce inflation gases which pressurize the first portion 28 of the combustion chamber 20. The increased pressure within the first portion 28 of the combustion chamber 20 open the weakened zone 80 of the plate 78 causing the petals 82 to extend into the filter chamber 22. More specifically, the petals 82 of the plate 82 extend into the opening 68 of the filter 62. As shown in FIG. 1A, the petals 82 continue to open until they are radially opposed by the first portion 62A of the filter 62 at the first axially extending portion 68A of the opening 68. As such, the petals 82 are radially spaced from the second portion 62B of the filter 62 at the second axially extending portion 68B of the opening 68 for unimpeded flow of combustion gases in a radial direction. The combustion gases from the first gas generant material 30 pass radially through the filter 62 and are exhausted through the radially extending ports 64. Given the lower density of the filter 62 at the first portion 62A, flow of the combustion gases radially passes not only through the second portion 62B of the filter 62 but also through the first portion 62A. It will be appreciated that the reduced diameter portion of the opening 68 of the filter 62 services to block movement of the petals 82 and thereby reduces variability in performance of the inflator 10.

When the second ignition device 42 is activated, the second gas generant material 34 is activated to produce a second source of inflation gases. Upon activation of the second gas generant material 34, the second source of combustion gases pressurize the second portion 32 of the combustion chamber 20. The increased pressure within the second portion 32 of the combustion chamber 20 displaces the lid 46 from the closed position to the open position. A flow path is maintained between the lid 46 the gas generant retaining wall 26. Again, it will be understood that this flow path maintained between the lid 46 and the gas generant retaining wall 26 is not specifically represented by arrows in FIG. 1A. It will be further understood, however, that this flow path even further reduces variability in performance of the inflator 10. The combustion gases from the second gas generant material 34 similarly pass through the openings 36 in the gas generant retaining wall, through the opening in the plate 78, axially into the opening 68 of the filter 62, radially through the filter 62 and out the ports 64.

While specific embodiments and applications of the present disclosure have been illustrated and described, it is to be understood that the invention is not limited to the precise configuration and components disclosed herein. Various modifications, changes, and variations, which will be apparent to those skilled in the art, may be made in the arrangement, operation, and details of the methods and systems of the present disclosure without departing from the spirit and scope of the disclosure.

What is claimed is:

1. A dual stage inflator comprising:
    a housing defining an internal cavity including a combustion chamber, the combustion chamber including a first portion having a first gas generant material separated from a second portion having a second gas generant material;
    a gas generant retaining wall disposed in the housing;
    a first stage ignition device disposed in the first portion of the combustion chamber;
    a second stage ignition device disposed in the second portion of the combustion chamber; and
    a lid normally in a closed position closing the second portion of the combustion chamber and spaced from the gas generant retaining wall, the lid moveable to an open position opening the second portion of the internal cavity to release combustion gas and abutting the gas generant retaining wall in response to an increase of pressure within the second portion of the combustion chamber,
    wherein an outer side of the lid and the an adjacent side of the gas generant retaining wall are cooperatively configured to allow a flow of combustion gas between the gas generant retaining wall and the lid when the lid abuts the gas generant retaining wall in the open position.

2. The dual stage inflator of claim 1, wherein at least one of the outer side of the lid and the adjacent side of the gas generant retaining wall includes a planar portion and a raised portion, the raised portion abutting the other of the outer side of the lid and the adjacent side of the gas generant retaining wall when the lid is in the open position to maintain a combustion gas flow path therebetween.

3. The dual stage inflator of claim 2, wherein the outer side of the lid includes the planar portion and the raised portion.

4. The dual stage inflator of claim 3, wherein the raised portion outwardly extends from the planar portion in a direction away from the second portion of the internal cavity.

5. The dual stage inflator of claim 4, wherein the lid is stamped to define the raised portion.

6. The dual stage inflator of claim 4, wherein the raised portion of the lid is configured to maintain a generally parallel orientation between the gas generant retaining wall and the planar portion of the lid when the lid is in the open position and abutting the gas generant retaining wall.

7. The dual stage inflator of claim 6, wherein the raised portion of the lid includes at least three spaced apart points that abut the gas generant retaining wall to maintain the generally parallel orientation.

8. The dual stage inflator of claim 4, wherein the raised portion includes at least three legs each outwardly extending from a common point in a direction parallel to the gas generant retaining wall.

9. The dual stage inflator of claim 8, wherein each of the at least three legs has a generally convex shape in an outward direction.

10. The dual stage inflator of claim 4, wherein the raised portion has a cruciform shape with four legs each outwardly extending from a common point in a direction parallel to the gas generant retaining wall.

11. The dual stage inflator of claim 2, wherein at least one of the gas generant retaining wall and the raised portion of the lid is constructed of a material that partially deforms upon movement of the lid from the closed position to the open position so as to increase surface area contact between the lid and the gas generant retaining wall to avoiding tilting of the lid while maintaining the combustion gas flow path therebetween.

12. A method of providing inflation gases to a safety device with the dual stage inflator of claim 2, the method comprising:
    activating the second stage ignition device;
    increasing a pressure in the second portion of the internal cavity to move the lid to the open position abutting the gas generant retaining wall; and
        maintaining the combustion gas flow path for combustion gases between the lid and the gas generant retaining wall with the raised portion of the lid.

13. The method of providing inflation gases to a safety device of claim 12, further comprising partially deforming at least one of the gas generant retaining wall and the raised portion of the lid in response to movement of the lid from the closed position to the Open position to increase surface area contact between the lid and the gas generant retaining wall to avoiding tilting of the lid while maintain the combustion gas flow path therebetween.

14. A dual stage inflator comprising:
    a housing; and
    a cavity within the housing bounded on one side by a vented wall, the cavity including a first portion and a second portion separated from the first portion, the first portion containing a first stage ignition device and a first gas generant material and the second portion containing a second stage ignition device and a second gas generant material;

wherein the second portion of the cavity is at least partially defined by a second stage cup and a lid, the lid operative in a first position and a second position such that in the first position the lid is spaced from the vented wall and closes the second portion from the first portion and in the second position the lid abuts the vented wall and opens the second portion to the first portion; and wherein an outer side of the lid and the an adjacent side of the vented wall are cooperatively configured to allow a flow of combustion gas between the vented wall and the lid when the lid abuts the vented wall in the second position.

15. The dual stage inflator of claim 14, wherein at least one of the outer side of the lid and the adjacent side of the vented wall includes a planar portion and a raised portion, the raised portion abutting the other of the outer side of the lid and the adjacent side of the vented wall when the lid is in the second position to maintain a flow path therebetween.

16. The dual stage inflator of claim 15, wherein at least one of the vented wall and the raised portion of the lid is constructed of a material that partially deforms upon movement of the lid from the first position to the second position to increase surface area contact between the lid and the vented wall to avoiding tilting of the lid while maintain a flow path therebetween.

17. The dual stage inflator of claim 15, wherein the outer side of the lid includes the planar portion and the raised portion.

18. The dual stage inflator of claim 17, wherein the planar portion of the lid and the vented wall are generally parallel to and spaced apart from one another in the second position of the lid.

19. The dual stage inflator of claim 17, wherein the raised portion is cruciform in shape.

20. The dual stage inflator of claim 19, wherein the raised portion includes four legs extending outwardly from a common point and each extending in a direction parallel to the planar portion.

* * * * *